United States Patent [19]

Haarer et al.

[11] Patent Number: 4,802,568

[45] Date of Patent: Feb. 7, 1989

[54] SORTING AND ORIENTING APPARATUS

[75] Inventors: Rolf Haarer, Winterbach; Theo Moser, Steinenberg; Klaus Reum, Korb, all of Fed. Rep. of Germany

[73] Assignee: Robert Bosch GmbH, Stuttgart, Fed. Rep. of Germany

[21] Appl. No.: 63,039

[22] Filed: Jun. 17, 1987

[30] Foreign Application Priority Data

Aug. 7, 1986 [DE] Fed. Rep. of Germany ....... 3626733

[51] Int. Cl.$^4$ .............................................. B65G 47/24
[52] U.S. Cl. ..................................... 198/388; 198/399
[58] Field of Search ............... 198/384, 388, 399, 397, 198/400; 221/158

[56] References Cited

U.S. PATENT DOCUMENTS

| 3,166,177 | 1/1965 | Laverty | 198/388 X |
| 3,537,567 | 11/1970 | Nowicki | 198/836 X |
| 3,791,553 | 2/1974 | Aidlin et al. | 198/388 X |
| 3,933,239 | 1/1976 | Yoshida | 198/384 |
| 4,353,456 | 10/1982 | Yamamoto | 198/397 |
| 4,393,973 | 7/1983 | Ackley, Sr. et al. | 198/384 |

FOREIGN PATENT DOCUMENTS 542124 9/1930 Fed. Rep. of Germany .
396239 1/1974 U.S.S.R. .

Primary Examiner—Frank E. Werner
Assistant Examiner—Cheryl L. Gastineau
Attorney, Agent, or Firm—Edwin E. Greigg

[57] ABSTRACT

Apparatus for selecting elongate containers from a mass of randomly-disposed containers such as capsules open at one end and at least partially closed at the other and depositing them with their open ends aligned for receiving a charge of material. The apparatus including first and second rotors, the first rotor including radially-disposed bores for receiving the containers and the second rotor including radially-disposed spokes for receiving containers with open ends toward the spokes. The first and second rotors including operable elements for removing the containers from the bores or spokes for transfer of the containers to a receiving device with the containers in the same orientation.

19 Claims, 3 Drawing Sheets

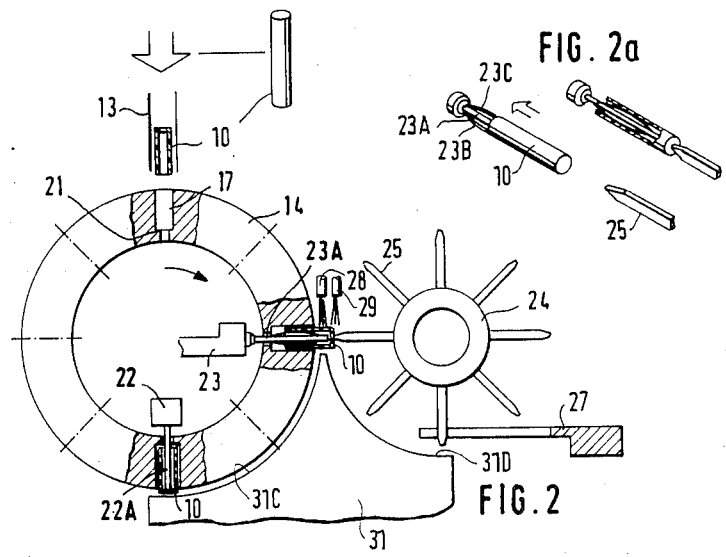
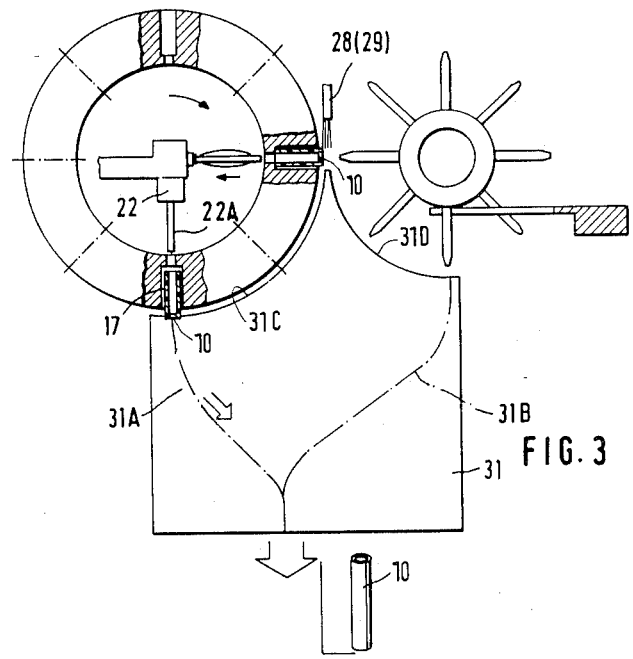

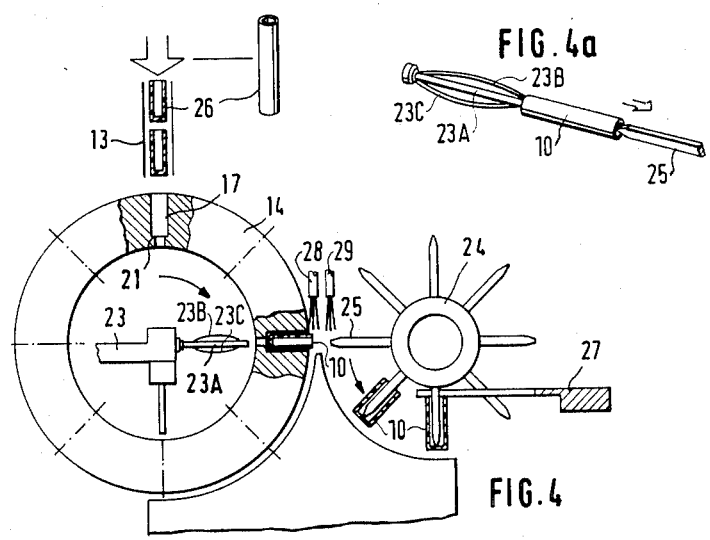
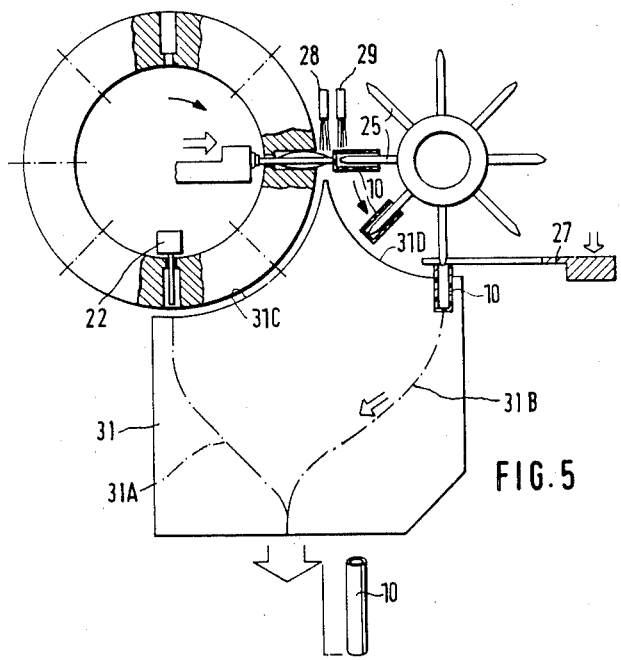

SORTING AND ORIENTING APPARATUS

BACKGROUND OF THE INVENTION

The invention is directed to improvements in sorting apparatus for orienting randomly-disposed, elongated containers such as tubes open at one end and at least partially closed at the other to dispose them in aligned positions for receiving a filling material.

SUMMARY OF THE INVENTION

The present invention provides a compact apparatus which is suitable for placing elongated containers, open at one end and at least partially closed at the other end, that arrive at the apparatus in a random manner into predetermined identical positions, e.g. so that the containers can be filled without difficulty in an ensuing filling apparatus.

The apparatus comprises a first rotor rotatable about a first axis, a second rotor rotatable about a second axis parallel to the axis of the first rotor, the first rotor containing radially-disposed bores and the second rotor having radially-disposed spokes, means for rotating the rotors to periodically bring the bores into alignment with the spokes, dispensing means above the first rotor for depositing the randomly-disposed elongate containers in the bores in the first rotor as the bores are moved into alignment with the dispensing means, means operable when the rotors move to positions wherein the bores are aligned with the spokes to eject the containers that are disposed with their open ends facing away from the center of rotation of the first rotor onto the spokes and means for retaining the containers that are disposed with their open ends facing toward the center of rotation, receiving means adjacent to the rotors for receiving containers from the rotors, rotation of the rotors being operable to dispose the containers next to the receiving means, open end uppermost facing toward the axis of rotation, and means for ejecting the containers from the rotors into the receiving means as the containers are moved into alignment therewith, the containers thereby being in the same orientation.

The invention will be better understood and further objects and advantages thereof will become more apparent from the ensuing detailed description of a preferred embodiment taken in conjunction with the drawings.

BRIEF DESCRIPTION OF THE DRAWINGS

FIGS. 2 and 3 show partly in section and partly in elevation a sorting roller and a sorting wheel with a hollow body disposed in the sorting roller with its closed end disposed radially outward from the center of rotation of the sorting wheel;

FIG. 2A shows in perspective the alignment of the tappets mounted to the sorting roller with the spokes mounted to the sorting wheel;

FIGS. 4 and 5 show partly in section and partly in elevation the sorting roller and sorting wheel with a hollow body disposed in the sorting roller with its open ends disposed radially outward from the center of rotation of the sorting roller; and FIG. 4A shows in perspective a tappet forcing a hollow body onto the spoke of the sorting wheel.

DESCRIPTION OF THE PREFERRED EMBODIMENT

Figure 1:
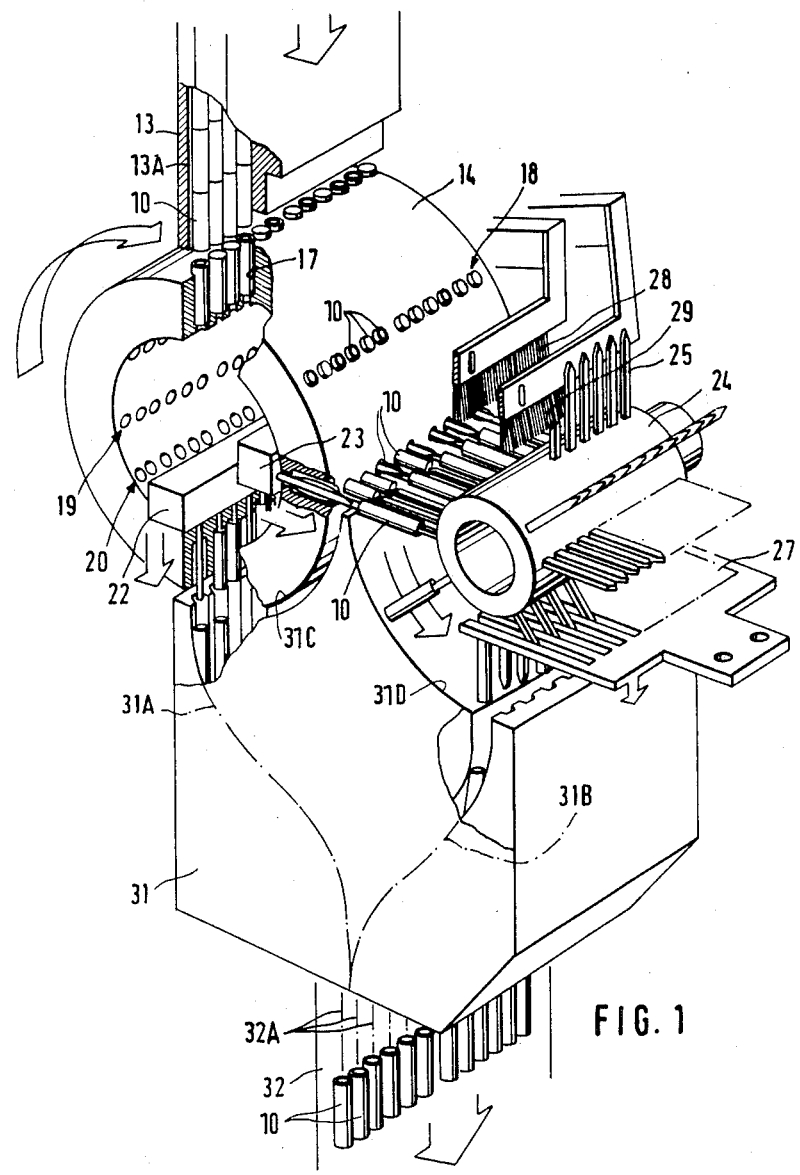
FIG. 1 is a perspective view of a sorting apparatus.

Referring to FIG. 1, there is shown a distributor 13 comprised of parallel tracks 13A for receiving randomly-disposed, hollow bodies 10 having one open end, for example, tubes, capsules and the like, from a hopper, not shown, and delivering them into radially-disposed bores or holes 17 formed in a cylindrical sorting roller 14. The annular sorting roller 14 contains peripherally-spaced, axially-disposed rows 18,19 of radially-extending holes or bores 17 corresponding in number to the number of guide tracks 13A of the distributor. Near the inner end of each bore 17, FIGS. 2 to 5 inclusive, there is an annular shoulder 21 forming an abutment at the inner end of the opening or bore 17 so that tubes 10 disposed in the bores cannot fall through, but, instead, are supported therein. The bores 17 are of a depth such that the tubes are preferably contained wholly within the bores whereby their outer ends are substantially flush with the peripheral surface of the sorting roller.

Parallel to the sorting roller 14 and spaced therefrom is a sorting wheel 24 rotatable about a horizontal axis parallel to the axis of rotation of the sorting roller 14 which has on it a number of radial, outwardly-extending pins or spokes 25 dimensioned to be received within the open ends of tubes 10 facing the sorting wheel when the spokes on the sorting wheel 24 are aligned with the bores 17 in the sorting roller 14. The spokes 25 correspond in number to the number of bores 17 in the rows of bores and are disposed in a plurality of peripherally-spaced, axially-disposed rows corresponding in number to the axially-disposed rows of bores 18, 19, etc. on the sorting roller 14. The ends of the spokes 25 are spaced from the outer circumference of the sorting roller 14 a predetermined distance. In the interior of the sorting roller 14, FIGS. 2 to 5 inclusive, there are two radially-movable slide members 22,23 which in their inoperative positions are located approximately at the axis of the sorting roller. The slide member 22 is vertically reciprocal and the slide member 23 is horizontally reciprocal. On the slide member 23, there is mounted an axial row of tappets or plungers 23A corresponding in number to the bores 17. The tappets 23A are oriented radially toward the sorting wheel 24. On the slide 22, there is an axial row of tappets or plungers 22A corresponding in number to the bores 17. The tappets 22A extend downwardly at right angles to the tappets 23A. Longitudinally-extending bowed spring elements 23B,23C are mounted to the tappets 23A, FIGS. 2A and 4A.

Below the sorting roller 14 and the sorting wheel 24, there is a receiver 31, FIGS. 1, 3 and 5, containing guide tracks 31A and 31B which extend downwardly from the sorting roller and sorting wheel. These tracks 31A,31B converge, as shown in FIGS. 3 and 5, and merge with a vertically-disposed, downwardly-extending guide track 32, FIG. 3. The guide tracks 31A,31B are disposed opposite one another with their upper ends adjacent, respectively, the lower sides of the sorting roller 14 and the sorting wheel 24 and with their lower ends merging with the upper end of the guide track 32.

The top of the receiver 31 is provided with downwardly-diverging arcuate surfaces 31C,31D concentric with the sorting roller 14 and sorting wheel 24, respectively, and closely adjacent thereto to prevent the tubes in the bores 17 and on the spokes 25 from falling off as they travel from the horizontal position to the vertical position.

The tubes 10 are delivered to the sorting roller 14 by way of the guide tracks 13A, FIG. 1, wherein they are randomly aligned with respect to the location of their open ends, that is, with the open ends at the bottom in some cases and at the top in other cases. The purpose of the sorting apparatus comprising the sorting roller 14 and the sorting wheel 24 is to align all of the tubes in such a way that they all assume the same position in the guide track 32, that is, with their open ends at the top. The sorting roller 14 and the sorting wheel 24 are rotated intermittently. When a row of bores 17 in the sorting roller 14 is at the top, tubes drop from the tracks 13A into the bores 17. Rotation of the sorting roller from the position wherein the bores 17 of the rows of bores are at the top to a horizontal position will bring the bores 17 into alignment with the spoke 25 of the sorting wheel 24 and with the tappets 23A within the sorting roller 14.

In place of sorting wheel 24, a second sorting roller can be used. The second sorting roller is configured similarly to the first sorting roller 14. The second roller also contains peripherally-spaced, axially-disposed rows of radially-extending holes or bores corresponding in number to the number of bores in the first roller. Near the inner end of each bore there is an annular shoulder forming an abutment so that tubes disposed in the bores are supported. The shoulder can preferably be partially open to permit a pin to move radially therethrough from the interior of the roller to aid in ejecting the tubes disposed in the bores. Tubes disposed in the bores of the first roller with their open ends facing outward toward the bores of the second roller will be pushed into the bores of the second roller and remain therein. The bores of the second roller may contain springs or other means to aid in retaining the tubes therein. The tubes transferred to the second roller will have their open ends facing radially inward. Tubes disposed in the bores of the first roller with their open ends facing radially inward will not be transferred to the second roller but will be retained in the bores of the first roller. Thus, tubes will be deposited into receiver 31, closed end first, from both rollers.

Referring now to FIGS. 2 and 3, assuming that a tube is located in one of the bores 17 with its open end facing inwardly, radial movement of the slide 23 will move the tappet 23A and the springs 23B,23C into the open end of the tube. Hence, it can displace the tube only so far as the tip of the spoke 25 opposite the bore because the bottom of the tube is arrested by contact with the spoke 25. As the slide 23 is retracted, the springs 23B,23C which are frictionally engaged with the tube pull the tube back into the bore 17 so that the closed end is substantially flush with the outer end of the bore 17. When, by further rotation of the sorting roller 14, the bore 17 reaches a position pointing vertically downward, the slide 22 moves vertically downward and its tappet 22A pushes the tube from the bore 17 into a guide track 31A of the receiver 31 with its open end up. From thence, the tube slides into one guide track 32A of the plurality of parallel vertical guide tracks 32, FIG. 3.

Referring now to FIGS. 4 and 5, if a tube is disposed in a bore 17 with its open end facing outwardly, when the sorting roller 14 is rotated so far that the bore is located opposite a spoke 25 on the sorting wheel 24, radial movement of the slide 23 and its tappet 23A will, by engagement with the closed end of the tube, push the tube onto the spoke 25. When the slide 23 retracts, it leaves the tube on the spoke. Following disposition of the tube on the spoke 25, the sorting wheel 24 rotates 90° with the tube thereon until the spoke and tube are in a vertical position. At the vertical position, a vertically-reciprocable slide or stripper bar 27 is actuated to push the tube into the guide track 31B of the receiver 31. This tube thereupon also enters the guide track 32 with the open end up so that now all of the tubes are disposed open end up.

Retaining brushes 28,29 are disposed at the place of alignment of the bores 17 with the spokes 25 for frictional engagement with the tubes to retain them until they become engaged with the surfaces 31C,31D of the receiver 31.

In operation, it does not matter if the open end or the closed end of a tube 10, bottle, or the like, is up or down. If the open end is down, the slide element 23 will hold the tube in the bore 17 when in the horizontal position, and when the sorting roller 14 rotates to the vertical position, the slide 22 will force the tube out from the bore 17 into the guide tracks 31A with its open end up. When the open end of the tube is in the bore with the open end up, the slide element 23 will force the tube out of the bore 17 onto the spoke opposite the bore. The tube is retained on the spoke 25 when the slide 23 retracts and when the wheel 24 rotates 90° to place the tube in a vertical position, the stripper bar 27 forces the tube off the spoke into the guide 31B with the open end up. Thus, the tubes will be positioned with their open ends up regardless as to whether the open end is up or down when first received in the bore 17 of the sorting roller 14.

The foregoing relates to a preferred exemplary embodiment of the invention, it being understood that other variants and embodiments thereof are possible within the spirit and scope of the invention, the latter being defined by the appended claims.

What is claimed is:

1. Apparatus for sorting and orienting randomly-disposed elongate containers which are at least partially closed at one end and open at the other end, the apparatus comprising a first rotor rotatable about a first axis, a second rotor rotatable about a second axis parallel to the axis of the first rotor, said first rotor containing radially-disposed bores of uniform cylindrical shape for receiving the containers and said second rotor having radially-disposed spokes, means for rotating said first and second rotors to periodically bring said radially-disposed bores into alignment with said radially-disposed spokes, dispensing means adjacent said first rotor for depositing said randomly-disposed elongate containers in said radially-disposed bores in said first rotor as said radially-disposed bores are moved into alignment with said dispensing means, means operable when said first and second rotors move to positions wherein said radially disposed bores are aligned with said radially-disposed spokes to eject said containers that are disposed with their open ends facing away from the center of rotation of said first rotor onto said spokes, and friction engaging means for retaining said containers by frictional engagement that are disposed with their open ends facing toward the center of rotation in said radially-disposed bores, receiving means adjacent said first and second rotors for receiving containers from said first and second rotors, whereby rotation of said first and second rotors align said containers with said receiving means, open end facing the respective axis of said first and second rotors, and means for ejecting said containers from said first and second rotors into said receiving means as said containers are moved into alignment therewith, said containers thereby being aligned in the same orientation.

2. Apparatus according to claim 1 wherein the first rotor contains a plurality of peripherally-spaced rows of radially-disposed, axially-spaced bores.

3. Apparatus according to claim 1 wherein the second rotor embodies a plurality of peripherally-spaced rows of radially-disposed, axially-spaced spokes.

4. Apparatus according to claim 1 wherein the first rotor embodies a plurality of peripherally-spaced rows of radially-disposed, axially-spaced bores and said second rotor embodies a plurality of peripherally-spaced rows of radially-disposed, axially-spaced spokes corresponding in number and spacing to said bores.

5. Apparatus according to claim 1 wherein the means for ejecting the containers disposed with their closed ends facing the center of rotation of said first rotor comprise plungers located within said first rotor in a position to be in alignment with the bores when the latter are aligned with the spokes and means for moving the plungers radially.

6. Apparatus according to claim 1 wherein the friction engaging means for retaining the containers disposed with their open ends facing the center of rotation of the first rotor comprise spring means frictionally engageable within the open ends of the containers.

7. Apparatus according to claim 1 wherein there is means for ejecting the containers from the spokes comprising stripper means operable to strip the containers from the spokes.

8. Apparatus according to claim 1 wherein there is means for ejecting the containers disposed within the bores with their open ends facing the center of rotation of the first rotor comprising plungers located within the first rotor in a position to be in alignment within the bores when the latter are in alignment with the receiving means and means for moving the plungers radially.

9. Apparatus according to claim 1 wherein there is limiting means at the inner end of each bore of the first rotor for limiting the depth of penetration of the containers into the bore.

10. Apparatus according to claim 9 wherein said limiting means comprises a radially-disposed abutment at least partially closing the bore.

11. Apparatus according to claim 1 wherein there are first and second guide tracks disposed adjacent the rotors for receiving the bodies from, respectively, the first and a second rotors and a third track into which containers from the respective first and second guides merge.

12. Apparatus according to claim 1 wherein the receiving means embodies a track vertically below the first rotor such as to be aligned with the vertically-disposed bores and a second track vertically below said second rotor such as to be aligned with a vertically-disposed spokes.

13. Apparatus according to claim 5 wherein said plungers are reciprocal.

14. Apparatus according to claim 5 wherein the friction engaging means for retaining the containers disposed with their open ends facing the center of rotation of the first rotor comprise spring means frictionally engageable within the open ends of the containers.

15. Apparatus according to claim 14 wherein the spring means are mounted on the plungers.

16. Apparatus according to claim 8 wherein said plungers are reciprocal.

17. Apparatus according to claim 1 wherein there are additional retaining means for constraining the containers within the bores and on the spokes while the spokes and the bores are aligned.

18. Apparatus according to claim 17 wherein said additional retaining means comprise brush means disposed in a position to have frictional engagement with the containers at their place of engagement with the spokes.

19. Apparatus for sorting and orienting randomly-disposed containers which are at least partially closed at one end and open at the other end, the apparatus comprising a first rotor rotatable about a first axis, a second rotor rotatable about a second axis parallel to the axis of the first rotor, said first rotor containing radially-disposed bores of uniform cylindrical shape adapted for receiving said containers, said second rotor having radially-disposed container retention means, means for rotating the rotors to periodically bring said radially-disposed bores into alignment with said container retention means, dispensing means adjacent said first rotor for depositing said randomly-disposed containers in said radially-disposed bores in said first rotor as said radially-disposed bores are moved into alignment with said dispensing means, means operable when said first and second rotors move to positions wherein said radially-disposed bores are aligned with said container retention means to selectively transfer said containers that are disposed with their open ends facing away from the center of rotation of said first rotor to said container retention means, and friction engaging means for retaining said containers that are disposed with their open ends facing toward the center of rotation, receiving means adjacent said first and second rotors for receiving containers from said first and second rotors, whereby rotation of said first and second rotors aligns said containers in the same orientation to said receiving means, open end facing the respective axis of said first and second rotors, and means for transferring said containers from said first and second rotors to said receiving means as said containers are moved into alignment therewith, said containers thereby being aligned in the same orientation.

* * * * *